United States Patent [19]

Manson

[11] 4,290,307
[45] Sep. 22, 1981

[54] GRAVITY MEASURING APPARATUS

[76] Inventor: Lewis A. Manson, 4602 Waring, Houston, Tex. 77027

[21] Appl. No.: 83,351

[22] Filed: Oct. 10, 1979

[51] Int. Cl.³ .............................................. G01V 7/08
[52] U.S. Cl. ................................... 73/382 R; 116/303
[58] Field of Search ................. 73/382, 451, 452, 454; 116/303, 333

[56] References Cited

U.S. PATENT DOCUMENTS

| | | | |
|---|---|---|---|
| 1,424,403 | 8/1922 | Hartman et al. | 73/451 |
| 1,746,627 | 2/1930 | Babbit | 73/382 |
| 1,802,150 | 4/1931 | Johnson | 116/303 X |
| 2,129,617 | 9/1938 | Hill | 73/451 X |
| 2,225,566 | 12/1940 | Ide | 73/382 |

FOREIGN PATENT DOCUMENTS

| | | | |
|---|---|---|---|
| 1536315 | 3/1954 | France | 73/451 |
| 370165 | 4/1952 | United Kingdom | 73/382 |

*Primary Examiner*—James J. Gill
*Attorney, Agent, or Firm*—Gunn, Lee & Jackson

[57] ABSTRACT

Gravity measuring apparatus is disclosed. In the preferred and illustrated embodiment, an apparatus utilizing a balanced container floating in a liquid rises and falls according to variations in gravity. Such variations in position are coupled to a measuring apparatus. In one embodiment, a horizontal beam pivotally mounted at one end and connected to the float as its center and nearly balanced about the pivot support at one end is deflected as the float rises and falls. Movement thereof is connected to a multiplier which enlarges the movement by some scale factor convenient to the circumstances in the range of 100 to about 1,000 to form an enlarged deflection of the multiplier adjacent to a motorized recorder, thereby forming a usable output indicia.

The multiplier includes a pivotally mounted, upstanding framework having counterbalances so that it can stand vertically above its pivot point and further incorporates a laterally extending arm to which movements of the horizontal beam are coupled, the length of the arm from the pivot compared to the length of the multiplier providing the ratio of multiplication desired.

15 Claims, 7 Drawing Figures

GRAVITY MEASURING APPARATUS

BACKGROUND OF THE DISCLOSURE

Gravity is considered to be a three-dimensional vector force. Utilizing an X, Y and Z-coordinate system, gravity can readily be defined as an attractive force between an object and the earth with the force having components in all three dimensions. If the coordinate system is conveniently defined at the center of the earth and the Y-axis is defined along the line between the earth and the object of interest, then the Y-component of gravity will be quite large compare to the X and Z-components. If they are conveniently defined as the north-south and east-west components (bringing into play the relatively well known surface coordinates on the earth), then those components are materially smaller. It will be appreciated that measurement of the Y or large component of gravity is extremely significant in certain scientific phenomena.

One phenomena where gravity measurements of the earth are extremely helpful is in prospecting for minerals. The earth is not a homogeneous body. As a result, it is known that pattern variations in the measurement of the vertical component of gravity over a given geological region may very well show a set of variations which are coherently related to the geology of the region. As an example, large masses of iron ore create regional discontinuities in the measurements which, on proper interpretation, yield valuable information for determining the extent of the mass of iron ore in the earth.

While regional variations in gravity occur, variations also occur at a given locale over long or short periods of time as a result of a variety of reasons including, as an example, movement of extraterrestrial bodies. Accordingly, a set of base measurements over a period of time are usually deemed necessary to have a fixed base measurement whereby mesurements taken in a large locale (for instance, in prospecting for various mineral deposits) are made so that all measurements can be referenced (by subtraction of time variations) to a common base station measurement to obtain time invariant measurements. To the extent that measurements at a given spot vary over a time interval, such variations are mathematically removed for the purpose of achieving a base station measurement taken in the locale. The present invention is a gravity meter which responds to variations in the vector component of gravity acting between the gravity meter and the earth and which converts such variations into a physical movement which can be measured and recorded on a time base chart.

The present invention has as one of its advantages a gravity measuring system using a hydraulically damped mass which mass moves in response to gravity variations. Such damping fairly well eliminates instrument system induced variations as might occur with an undamped structure. The mass moves responsive to variations over a period of time with sufficient damping so that overshoot, oscillations or transducer errors are not induced. The apparatus achieves this by utilizing a gravity attracted mass in a liquid bath. The system is balanced by supporting the transducer mass from a horizontal beam of significant length, one end of the beam being mounted on a pivot mount to enable the beam to deflect. The beam is thus rotated around its pivot by the transducer mass. The slightly arcuate movement of the transducer mass as it rotates around the pivot point of the mounting beam is an excursion of only a few microns, and, therefore, angular distortion of the response is minimal. The beam and hydraulic damping system which receives the transducer mass is relatively simple in structure and is, therefore, relatively straightforward in mounting. This is particularly advantageous in initially setting up the equipment and adjusting it to maximum sensitivity by eliminating off-balance mounting and other distorting forces.

An important feature of this apparatus is the multiplier which is incorporated. The multiplier is an apparatus which connects with the horizontal beam and enlarges movement thereof. The multiplier converts the relatively small movement of the transducer mass into a much larger movement by a scale factor of between approximately 100 to 1,000. This scale factor is controlled by sizing of the multiplier. Accordingly, it can be varied to a requisite value for the purpose of obtaining a different excursion in response to the transducer mass. The multiplier has as one feature the incorporation of a indicator disk mounted at its remote upper end. The indicator disk is observed in location by utilization of a photoelectric sensor and light bulb, thereby coupling movements of the indicator disk to a recording instrument.

From the foregoing, it will be understood how the apparatus is able to respond to variations in the vertical component of gravity which are converted into excursions of significant amplitude. They are converted and placed in a form enabling recordal on a time base chart mechanism.

BRIEF SUMMARY OF THE DISCLOSURE

This disclosure is directed to a gravity measuring device utilizing a transducer mass having the form of a large, vented tank submerged in a fluid. The tank rises and falls in response to gravity attraction variations. The tank is connected to and supported from a horizontally mounted beam rested on a pivot at one end. The opposite end is free to move in response to variations of gravity. As the transducer mass rises or falls, the free end of the arm is moved. Its movement is supplied through a coupling mechanism to a muliplier means which is an upstanding column having a length of between about 100 to 1,000 times greater than the lever arm coupled to it to multiply the rather minute movements of the horizontal beam. The movements are observed through the use of an optical sensor system which located an indicator disk at the top end of the multiplier.

BRIEF DESCRIPTION OF THE DRAWINGS

So that the manner in which the above recited features, advantages and objects of the invention, as well as others which will become apparent, are attained and can be understood in detail, a more particular description of the invention briefly summarized above may be had by reference to the embodiments thereof illustrated in the appended drawings, which drawings form a part of this specification. It is to be noted, however, that the appended drawings illustrate only typical embodiments of the invention and are not to be considered limiting of its scope, for the invention may admit to other equally effective embodiments.

DETAILED DESCRIPTION OF THE ILLUSTRATED EMBODIMENT

Figure 1:
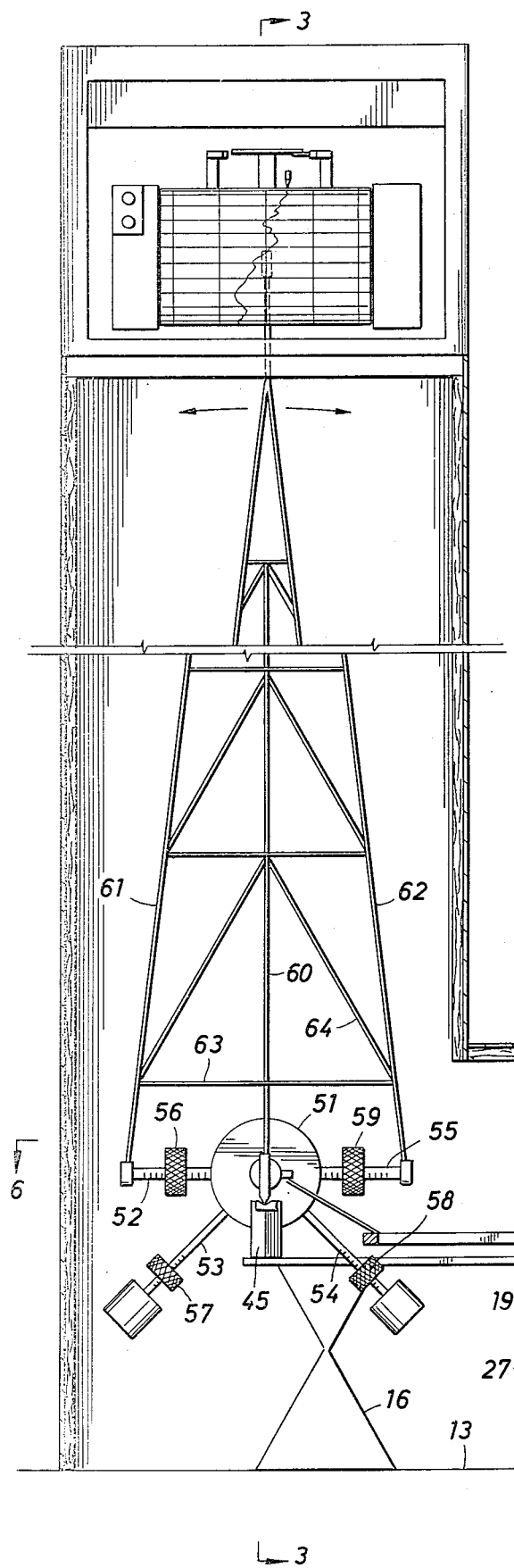
FIG. 1 shows the gravity meter apparatus of the present invention installed in a housing which includes a strip chart recorder.

Attention is directed to FIG. 1 of the drawings, where the numeral 10 identifies the gravity measuring instrument of the present invention which is responsive to the vertical or Y-component of gravity. It responds to the component which acts along a line from the center of the earth to the measuring instruments. It will be observed that gravity is a three-dimensional vector having perpendicular components in the other two dimensions which are not measured by this instrument. This instrument measures the component of most significance. The gravity measuring instrument 10 is received in a housing which is generally shaped as an "L". It has metal plates 11 which cover it and support insulative material 12. It rests or is supported on a floor 13.

The floor 13 need not be any special surface. Ordinarily, a concrete slab will suffice. Other surfaces can also be used. The covering 11 is in the form of relatively thin plate material. Preferably, it provides shielding against penetration of the housing by electromagnetic radiation. This reduces errors in the operation of the equipment. The insulation material 12 stabilizes the interior to a selected temperature level. It is preferably stable with fluctuations limited to about 1.0° C.

The housing 11 is supported by suitable frame members. The housing seals the interior against entry of light. It is not necessary to seal the interior against atmospheric fluctuations; they do not provide a an important source of error, although controlled pressure is more desirable.

A pair of duplicate elongate brackets 14 extend in the housing, and they are supported on upstanding braces 15 and 16 shown in FIG. 1. The two L-shaped frame members are stationary and are spaced apart. They support equipment which will be described. They pass in front of and behind a cylindrical tank 17 filled with a liquid 18. Water is acceptable for the tank. Other fluids preferably have a reduced or minimal evaporation rate. The water 18 is normally prevented from evaporating by placing oil 19 on the surface of it to reduce evaporation to a minimum.

The tank 17 is fairly large, having a capacity of a few liters. It terminates at a top shoulder 20 which includes a sharp, radially inwardly directed edge. This cooperates with the surface oil 19 to reduce evaporation, contact being maintained with the surface oil.

Figure 2:
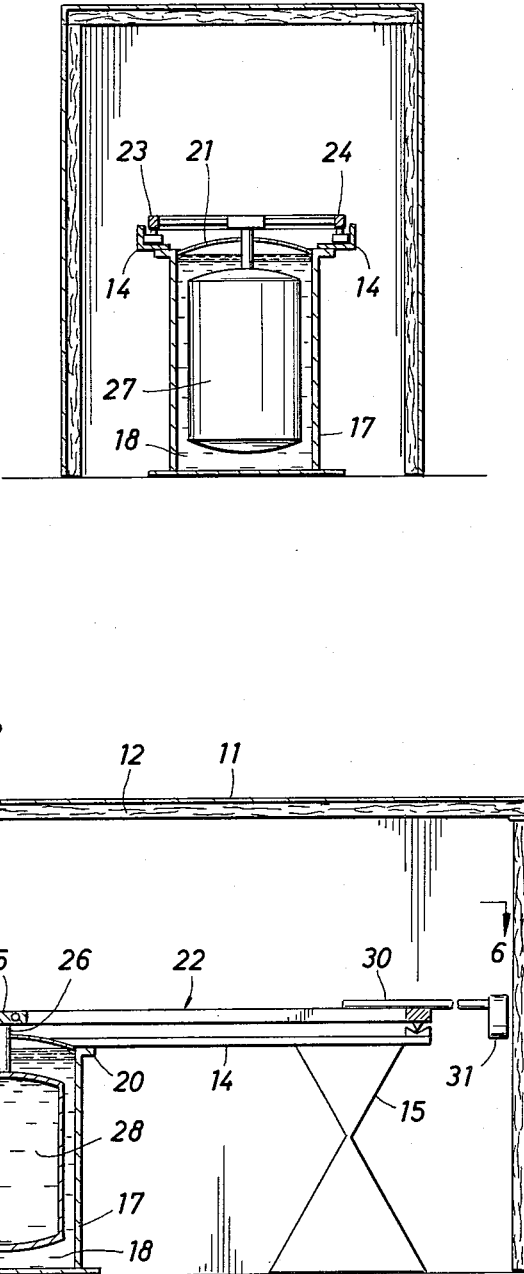
FIG. 2 is a sectional view along the line 2—2 of FIG. 1 showing a transducer mass having the form of a tank received in a hydraulic damping bath.

As shown in FIG. 2 of the drawings, a nonwetting hood 21 spans the top. It has a central hole or opening to permit the equipment to operate through it. The hood 21 can be made of metal and is internally coated with a nonwetting material such as Teflon.

Figure 6:
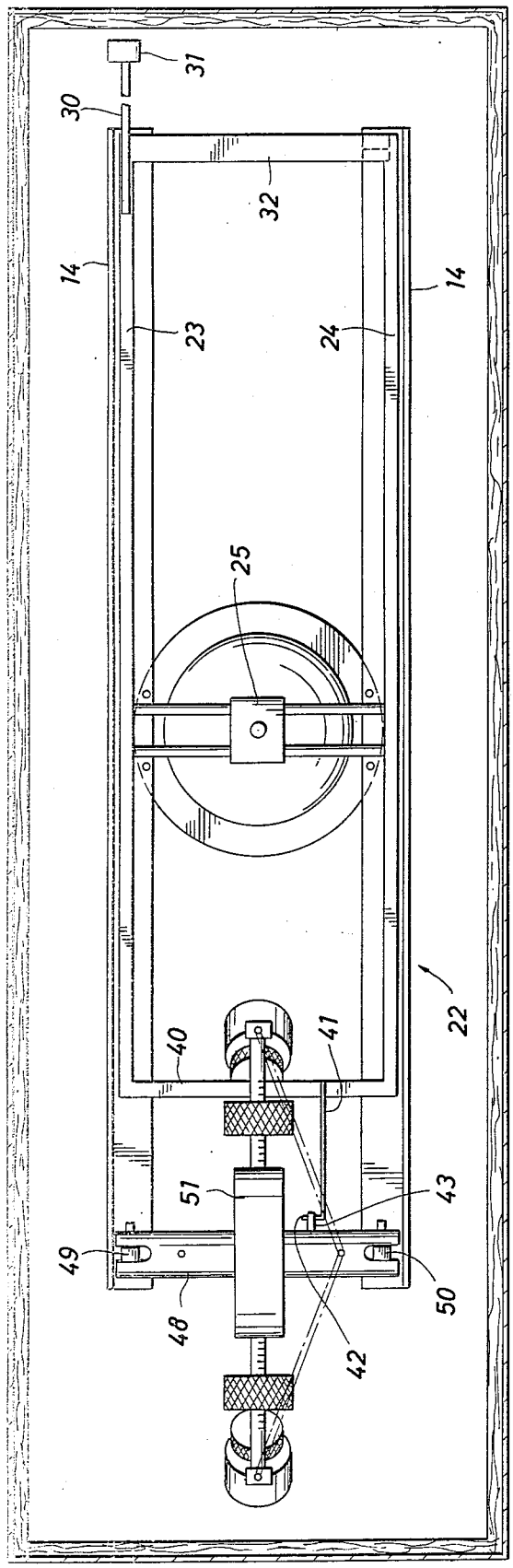
FIG. 6 is a plan view of the horizontal beam taken along the line 6—6 of FIG. 1.

The numeral 22 identifies a horizontal beam structure. Speaking generally, it is a fairly large framework having a maximum measure along its length and is relatively narrow through it. No particular ratio need be achieved. It is a framework formed of metal members as better shown in plan view in FIG. 6. FIG. 6 shows the horizontal beam 22 extending in the cabinet or housing which encloses it. It includes a back frame member 23 and a parallel front frame member 24 which are of equal length and parallel to one another. They support a transverse, centralized cross brace 25 constructed with a pair of parallel rods which support a centrally located block which, in turn, connects to a hollow tube 26. The tube 26 is open to atmosphere and opens into the interior of a tank 27. The sensitive element of the present invention which functions as a transducer means is the tank 27. The tank 27 is substantially closed, but it is open on the interior to receive a liquid 28. It is open to the exterior through the narrow conduit 26.

As viewed in FIG. 1, the horizontal beam 22 is pivotally mounted at one end. It is able to rotate about the pivot mounting. As it rises or falls, it moves the other end along an arc. Movement is initiated by gravity fluctuations acting on the tank 27. It functions as a buoyant element and is almost balanced. That is, it is almost balanced to zero buoyancy, taking into account the weight of the entire system. It is able to float and has a tendency to float slightly, this tendency being represented by a slight offset from perfect balancing of the buoyant forces. The tank 27 thus responds to fluctuations in gravity. It is raised or lowered as gravity fluctuates over a period of time.

The closed tank 27 is a float filled with a liquid 28 which has reduced specific gravity in comparison with the damping fluid 18. This adjusts the buoyancy so that the net buoyancy is slight. The buoyancy is nearly zero without being zero. If it were zero, no imbalance would occur, and the float would not rise or fall. Perfectly neutral buoyancy wuld be nonresponsive to time variant gravity. The conduit 26 is hollow and is open to atmosphere so that the tank 27 is open to atmosphere. This enables atmospheric variations in pressure to be supplied to the interior of the tank 28 to avoid relative pressurization of the tank. The tank 27 is floated within the bath and rises and falls with variations in gravity or vertical components of crustal surges. As the tank rises or falls, such variations are connected through the mounting stem 26 to the beam 22.

The beam 22 is pivotally mounted. For a better understanding of this, attention is directed to FIG. 6 of the drawings which shows the beam 22 in greater detail. The beam 22 includes a counterbalance arm 30 and a counterbalance weight 31. They extend to the right of a pivot point. The remainder of the beam is to the left of the pivot point. The pivot point is the fulcrum around which the beam 22 rotates. Because the beam has significant width, it is desirable to utilize two pivot points which are on a common axis of rotation, as better shown in FIG. 7 of the drawings. There, the beam will be observed to include parallel frame members 23 and 24 which join together at a transverse frame member 32 at the end of the beam. The frame member 32 supports a pin 33 which has a lower face which is pointed in a conic surface. It defines a point 34 at the lower tip which has an included angle which is relatively sharp in comparison with the mating component. The point 34 is received into a support block 35 having a dished portion in the center which is a conic surface. The angle is relatively shallow. The point 34 is thus supported in the dished area with point contact. The point 34 is centered within the dished area by the shape of the conic surface. The support block 35 is supported on the fixed frame members 14.

The horizontal frame member 32 supports a metal pin 36 which extends downwardly and terminates at a knife edge 37. The knife edge 37 is, when viewed on end, the lower apex of cut and polished surfaces terminating at the apex. Again, they describe an acute angle between them. A support 38 is positioned on the frame 14 and has the form of a rectangular block having an upper face machined into a pair of sloping surfaces. The sloping surfaces come together at an angle which is greater than the acute angle of the knife edge 37. As an example, the knife edge 37 might be formed by a pair of faces inscribing an angle of about ninety degrees. The support means 38 receives the knife edge 37 in a pair of faces which define an angle larger than ninety degrees. As a result of this arrangement, the knife edge 37 makes line contact with the support surface below it.

The knife edge 37 has a finite length as, for instance, a few millimeters. The support means 38 beneath it is sufficiently longer that the knife edge is able to move to the right or left, enabling insertion of the knife edge into the support surface. Moreover, it permits the equipment to be fixed against lateral movement whereby the point 34 is first positioned, and the knife edge is thereafter positioned. It will be appreciated that the knife edge 37, if extended through space, would pass through the point 34. This defines a common axis of rotation for the horizontal beam 22.

As described to this juncture, the beam 22 pivots along a frictionless edge which is defined by the point 34 aligned with the extended knife edge 37. Movement to the left or right as viewed in FIG. 6 is not permitted. No binding occurs because the frame members 14 are sufficiently spaced from the apparatus to enable the point and edge supports shown in FIG. 7 to function freely without binding.

Continuing with the description of the horizontal beam 22, it will be observed in FIG. 6 to incorporate an end frame member 40 parallel to and opposite the end transverse member 32. The members 32 and 40 are parallel, and they move with the unit as deflection occurs. The transverse frame member 40, being at the remote end, moves in an arc about the pivot point at the opposite end. When it rotates, it moves a long, thin marker 41 which has a protruding tab 42. This is received in an eyelet 43, better shown in FIG. 5 of the drawings where the tab 42 protrudes through the eyelet 43. As the tab 42 is deflected upwardly or downwardly traveling about the pivot at the opposite end, it moves the eyelet 43. The eyelet 43 is deflected upwardly or downwardly on rotation. When the eyelet 43 is contacted by the tab 42, it is pushed upwardly or downwardly. The eyelet is mounted so that movement occurs after contact, and, given the whisker-like construction of the marker 41, frictional drag is reduced to an insignificant amount. Drag is significantly eliminated by microseismic movement.

As described to this juncture, changes in the vertical component of gravity raise and lower the tank 27 which serves as a transducer means responsive to gravity fluctuations. It moves in a liquid bath which damps its movement and is rigidly aligned by the mounting of the beam 22. The beam 22 has moderate length, perhaps 2.0 meters or so, while the tank 27 encloses a capacity of 2.0 liters, more or less. the tank is mounted at approximately the midpoint of the beam, and its movement, being in the range of microns, is multiplied by the ratio of the length of the beam to the lever arm to the mounting of the tank 27. This is approximately a 2:1 multiplication. This multiplication is not critical. At this juncture, the range of movement is relatively small and difficult to work with. It is multiplied in a manner to be described by a factor ranging between about 100 and 1,000-fold to yield a deflection of greater size.

Figure 7:
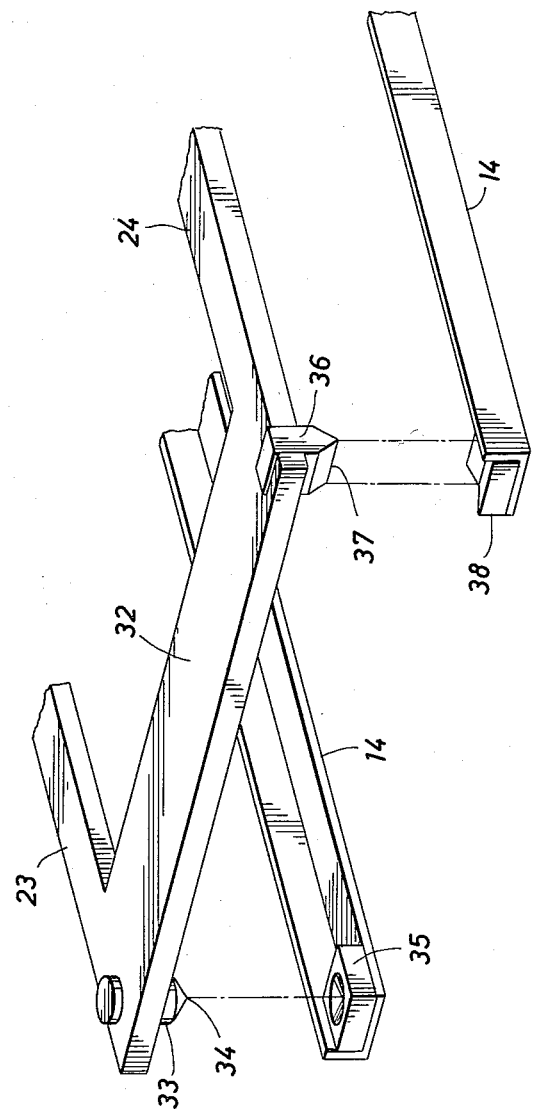
FIG. 7 is a detailed perspective of the pivot mounting system used in the apparatus.

The frame member 14 supports an upstanding post 45 shown in FIG. 1. The post 45 is parallel to a similar post which is obscured in FIG. 1. The two posts terminate in surface areas similar to those shown in FIG. 7. One post terminates in a flat, dished surface having a conic cut terminating at a shallow point. The other post terminates at a pair of faces which are V-shaped to thereby define a surface receiving a knife edge. The equipment shown in FIG. 7 is duplicated to this extent. FIG. 6 discloses a shaft 48 which supports an inserted pin 49 at one end and a similar pin 50 at the other end. The pins 49 and 50 terminate in the point and knife edge construction shown in FIG. 7 and are supported on the posts therebelow. This defines an axis of rotation for the shaft 48. The axis of rotation is below the shaft 48, not through it. The axis of rotation, being below the shaft, is the axis of rotation for the eyelet 43 previously mentioned. The precise location of the axis of rotation may be altered dependent on shaft construction and mounting.

As shown in FIG. 1, the shaft 48 supports a circular weight 51 which is a weight centered on the shaft. In particular, the weight 51 is balanced to the right and left as viewed in FIG. 1. It supports four protruding arms 52, 53, 54 and 55 which, in turn, each support weights 56, 57, 58 and 59 on the respective shafts. The several weights are adjustable in location and are moved by rotating them, the several shafts being threaded. As the weights move on the threaded shafts, they can be moved outwardly or inwardly. When they are moved outwardly, they increase the torque which they cause, tilting the apparatus in that direction. The amount of weight is preferably symmetrical along the centerline of the equipment so that the weights 56 and 59 are balanced against one another. In like manner, the shafts 52 and 55 are constructed similarly, and the shafts, themselves, contribute to the fixed, nonadjustable weight in the structure. The aggregate weight is in the range of 5.0 to 30.0 kilograms, counting the centered, circular weight 51. This quantity of weight lends stability to the structure which is mounted on a knife edge for rotation. The several weights are adjustable and thereby permit calibration. Calibration is achieved when the multiplier apparatus is vertical. Any upright position which is stable is acceptable. Centering is desirable to permit wide fluctuations in either direction.

FIG. 1 of the drawings discloses upstanding rods 60 in the center and rods 61 and 62 on the outer edges, the three rods defining an upstanding pointer framework. The framework is light and fairly wide at the base, being in the range of 5.0 to 25.0 centimeters width in the preferred embodiment. Moreover, the frame member or rod 60 is forward of the other two rods as better shown in FIG. 3. The several vertical extending rods 60, 61 and 62 are supported by various cross-bracing members 63 and 64 which are added to provide structural rigidity. It will be observed that the three rods taper upwardly to intersect at a junction 65 where they are brazed or soldered together. If desired, the rod 60 can be duplicated by placing a similar rod supported on the center shaft 48 at the back end of the shaft to add a fourth leg. The upstanding structure is basically rigid and does not flex or bend. It is very important that the structure stand erect free of bending. Movement is coupled to the tip without bending.

Figure 3:
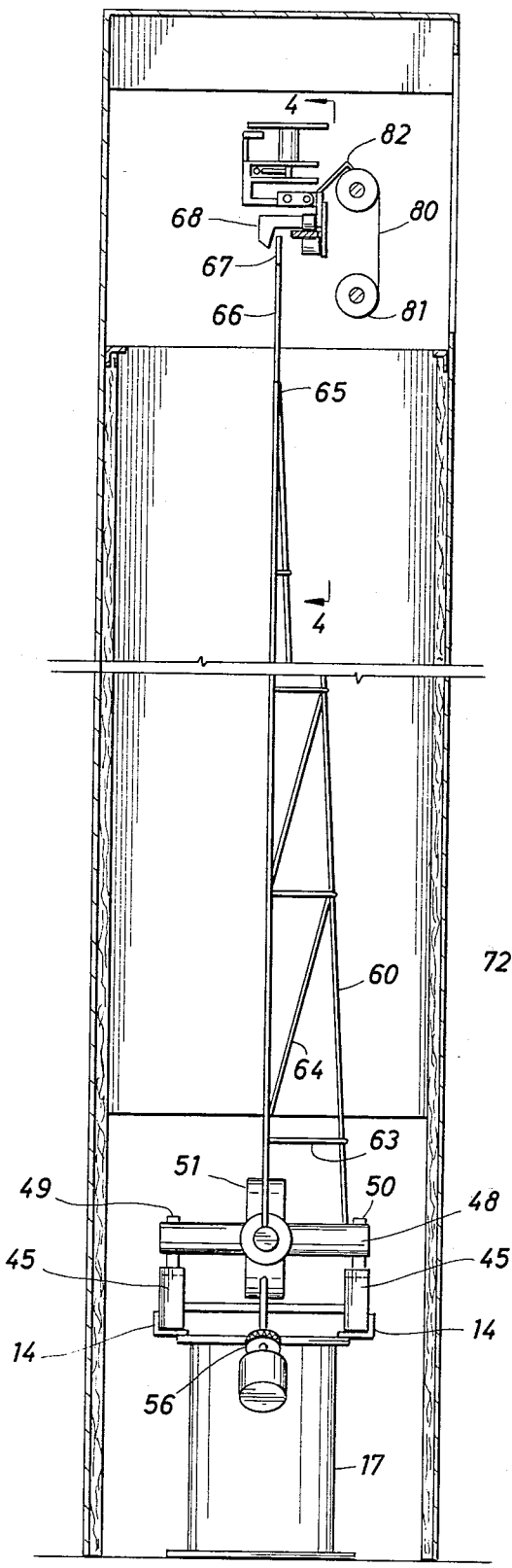
FIG. 3 is a sectional view along the line 3—3 of FIG. 1 showing details of construction of the multiplier arm.
Figure 4:
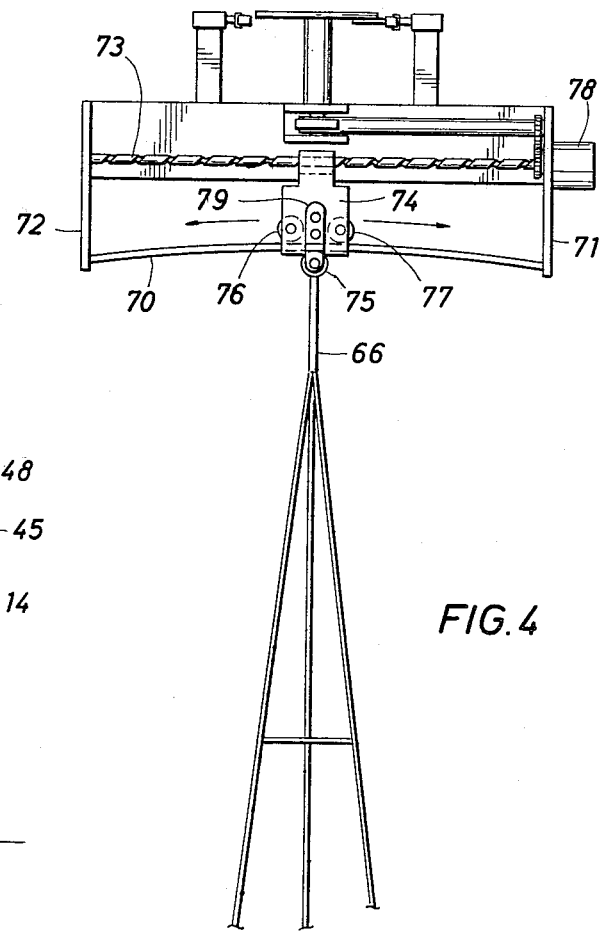
FIG. 4 is a view in enlarged scale taken along the line 4—4 of FIG. 3 which shows the mounting of a transducer which follows an indicator disk to convert movement of the indicator disk into a signal for recording on a strip chart recorder.

The several rods come together at the junction 65 and support an upstanding single rod 66. The rod 66 is relatively rigid, and it, in turn, supports an indicator disk 67. As shown in FIG. 3, the indicator disk 67 is immediately adjacent to a detector mechanism including a protruding arm 68 which supports a light and a photocell in the structure. This is better understood by referring to FIG. 4 of the drawings. FIG. 4 shows an arcuate track 70 about the axis which is defined by the knife edge holding the multiplier apparatus vertically. The arcuate track 70 is a rectangular metal member which extends between end plates 71 and 72. They, in turn, support a lead screw 73. A carriage 74 travels along the lead screw by means of a motorized traveling nut which is obscured by the housing seen in FIG. 4. The traveling nut rotates clockwise or counterclockwise on the screw 73, moving the carriage 74 along the lead screw 73. As it travels, it engages the arcuate track 70 with rollers 75 on the bottom and 76 and 77 which are above the track 70. The track 70 is curved as mentioned before. FIG. 4 slightly exaggerates its curvature for sake of clarity. The curvature is such as to require the carriage 74 to elongate slightly as the carriage moves toward the end frame members 71 and 72. The rollers maintain engagement so that the carriage is referenced to the curved track 70. While its motive force is supplied via the lead screw 73, the lead screw 73 is, in turn, rotated by a motor 78. The motor 78 rotates clockwise or counterclockwise to thereby drive the carriage. The carriage elongates by permitting a sliding mounting bar 79 to extend slightly. Extension is in the millimeter range.

The carriage 74 supports the rearwardly protruding arms 68 shown in FIG. 3. The disk 67 is a target for the apparatus. The disk 67 is visually detected by illuminating a lamp carried on the carriage. The lamp passes light through a small hole in the disk 67, and the light falls on a photocell. Ambient light is ordinarily excluded from the cabinet or housing. The carriage 74 thus follows the target disk 67 to the right or left. When the photosensitive device detects the light that passes through the hole, the carriage motor 78 is stopped. When the disk 67 moves, the carriage 74 travels with it. The carriage 74 thus travels in response to a circuit connected to the photosensitive device, the device being connected to an amplifier of a servoloop connected to the drive motor 78. Thus, the carriage 74 moves to the right and left.

As shown in FIG. 3, chart paper 80 traveling from a supply spool 81 moves upwardly and is wrapped around an upper spool. The carriage 74 supports a marker 82 shown in FIG. 3 which preferably is an ink or ball point pen for marking on chart paper. Paper is supplied at a clocked rate so that its travel is regulated to some scale factor. Deflections marked on the chart are also marked against arbitrary scale calibrations on the chart which are used later to calibrate the gravity instrument.

The disk is coupled by capacitance, reluctance or optical coupling. It is important to avoid coupling which drags the disk, a form of bias. The coupling is, therefore, minimal, being reduced by using small plates in a capacitive system, an aluminum disk in a magnetic system or a perforated disk in an optical system. Bias is further reduced by orienting the disk position detector system perpendicular to the plane of movement. In FIG. 4, the disk 67 moves right or left, and the detection coupling is at right angles.

The system as described to this juncture follows the indicator or target disk 67. It will be appreciated that it is not coupled in any way to create drag. So to speak, there is an infinite impedance coupling between the two. They are, in that sense, completely independent of one another, except that the carriage 74 follows the location of the target disk 66. Hunting or oscillations as a result of the movement of the carriage are held to a minimum. This can be achieved by utilizing a relatively small opening in the target 67. A larger target can be used, and a colored or optical filter placed in it to screen the light from the light bulb can be used. If desired, a particular wavelength of light can be used to trigger the photosensitive device which follows the light. As the target moves to the right or left, it cuts down on the light which falls on the photocell. As the photocell detects less light, it creates a signal which drives the motor 78. The motor 78, when driven, repositions the carriage 74 to increase the amount of light falling on the photocell. Another form of detector utilizes an aluminum disk mounted near a pair of spaced magnetic coils. The aluminum disk slightly responds to vary the reluctance of the two magnetic circuits so that a null is found at a centered position, or an unbalance is formed which, on amplification, will drive the motor. While this might be termed a magnetic coupling, the poor aluminum response prevents inductive drag or bias on the disk.

In one embodiment of the present apparatus, the multiplication is at least 100-fold. Multiplication is determined by the ratio of the length from the target disk 67 to its axis divided by the lever arm to the eyelet 43 shown in FIG. 5 from the same axis. While the multiplier arm might be quite heavy, nulling its weights to obtain a delicate balance when the device is being set up results in a highly sensitive multiplier. The multiplier does not drag or otherwise impede operation of the system. Rather, it responds in a way that enables the arm to be deflected free of frictional drag and other similar impediments. Again, drag is minimal in the direction of movement. The disk is not biased, reducing errors to a minimum.

Preferably, the apparatus of the present invention is made of nonmagnetic material. It is preferably made of material which is relatively temperature stable. It is also made of material which ordinarily does not corrode on exposure to atmosphere. It is housed in a temperature stabilized container. The housing is preferably sealed against light to avoid radiation heating of the interior which will typically create unwanted air currents. Further, the present apparatus is formed of material which is reasonably strong and free of galling at the contact areas. This is particularly true for the knife edge and point support arrangement shown in FIG. 7. There, point loading and edge loading is fairly notable, and the surfaces are thus preferably made of nongalling alloys.

The device of the present invention is used in the following manner. The beginning point is nulling the system. The float is nulled by first placing the float 27 in the bath 18. Its weight is adjusted by adding liquid 28 to it. After it is floating at a central and nearly neutral position, it is then ready to be used. This central or null position is achieved whereby the buoyancy of the tank, the weight of the beam 22, the offset provided by the counterbalance 31 and all other factors leave it nearly balanced in a horizontal posture with the float 27 clear of the walls of the tank 17 and fully submerged in the bath 18. The bath 18 does not evaporate as a result of the oil 19 placed on its surface. The liquid 28 in the tank 27 does not evaporate because it has a very minimal surface area exposed to atmosphere. If desired, it can be topped off by adding oil to the surface to reduce evaporation. At this juncture, the equipment will function as a gravity meter.

The beginning position requires a slightly buoyant offset from a perfect balance. Perfect balancing would make the float insensitive to gravity fluctuations. If the fluctuations are to be measured, the float must not be perfectly balanced so that it will move with changes in gravity force. This requires an offset from perfect balance by an amount set by scale factors.

Movements are relayed to the marker 41. Such movements, however, are too small to be useful in most instances. They can be inspected only by means of a microscope directed to the marker, and this is somewhat tedious in that it requires continual human observation. The present invention thus incorporates the multiplier means which multiplies the movement by a scale factor to be specified.

The first step in utilization of the device is to balance it. This requires movement of the weights so that the multiplier means stands vertically upright and true measured against the arcuate track 70 shown in FIG. 4. In other words, it is initially positioned in a true, upright position against a reference mark on the track 70. Precise centering relative to the chart paper is convenient, but not essential. If centered, fluctuations in either direction can be recorded. If not centered, the fluctuations in one direction may drive the graph off the paper. For this practical reason, an arbitrarily located initial position is determined, and the disk 67 is positioned in alignment with it. This is accomplished free of engagement with the marker 41. This requires manipulation of the weights which are moved to relocate the center of gravity of the multiplier means. When the weights have been moved to the required location, they are then fixed in location. At this juncture, the multiplier means has then been located. The carriage 74 is driven by the motor 78 to the beginning position where it optically detects the location of the target disk 67. After the marker 41 has been positioned in the eyelet 43, the device is then ready to operate. As gravity excursions occur, a mark is made on the chart recorder shown in FIG. 3. The trend of the marks gives gravity excursions. The line which is drawn on the chart as a function of time can thus be scaled to gravity variations.

One advantage of the present apparatus is the ability to form a time base output on a strip chart. This compares quite favorably with other instruments which yield such fine movements that reading is accomplished through microscopes. The present invention thus has one advantage over other gravity meters. The present invention also utilizes a damped system. Damping occurs in the movement of the float 27 submerged in liquid. The liquid 18 determines the buoyancy, but it also serves as a damping material. Thus, those excursions which do occur occur with the change in gravity and do not include overshoot or damping oscillations. It will be understood that the time period of the damping system is negligible compared to the rate of change of gravity, and the damping, therefore, does not impede proper operation of the system.

Variations can be made in the present invention. Scale factors can be varied as will be understood from the foregoing description. The apparatus is scaled to a relatively large scale which aids in reducing small, localized disturbances such as spot heating. Inasmuch as all the equipment is preferably maintained in a temperature stabilized housing with the temperature held over the length of the measurement to about 1.0 degree fluctuation, the system is quite stable. The system is also stable in that the equipment is constructed of nonmagnetic material. This avoids attraction as a result of externally created magnetic fields. This would be particularly undesirable if the external field were to change, and this is highly probable in light of the long duration of gravity measurements. This invention avoids that difficulty. Structural creep and fatigue are believed to be eliminated from this structure. The movements occur on knife edge bearings. The damping system is the liquid in the tank, and it, therefore, does not fatigue. The lack of aging, creep or fatigue reduces or eliminates recalibration requirements.

The present invention incorporates a null or balanced system so that the weight of the equipment is not a critical factor. It is desirable only that the equipment be rigid and relatively strong, made of materials which are relatively stable and having sufficient weight which, coupled with the counterbalances, enables a balanced initial condition to be achieved.

A method of operation is disclosed which incorporates the following steps. First of all, the tank 17 is filled with the liquid 18. The tank 27 is inserted into the tank 17 and is filled. The tank 27 is submerged, and oil is poured on the liquid 18. The oil 19 or some other liquid which has minimal evaporation (typically as a result of the vapor pressure of the liquid) is placed over the tank 27. The tank 27 is partially filled. As it is partially filled, its buoyancy is reduced. Filling continues until it is substantially brought to a nulled position. That is to say, it is filled to the extent that it is almost neutrally buoyant. When this position is achieved, the transducer of the present invention is then prepared. At this juncture, the horizontal beam can function as a gravity meter in and of itself; the difficulty with this is that indications resulting from its movement are difficult to obtain. Such movements are miniscule and, therefore, difficult to observe except through microscopes and other aids of this sort.

Figure 5:
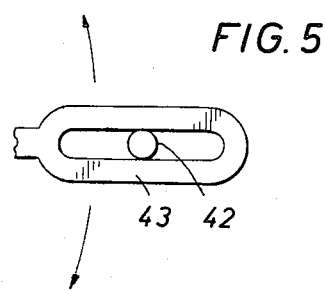
FIG. 5 is an enlarged, detailed view of the coupling system between the multiplier arm and the horizontal beam.

The present invention contemplates the use of the multiplier means so thoroughly described above. The multiplier enhances the range of movement by a scale factor. The enchancement is in the range of 100 to 1,000-fold. Movement is multiplied by the selected scale factor. The multiplier is initially set in a generally upright position. Thereafter, the weights are adjusted to balance it so that it does not deflect to the right or left. This may require several attempts as fine adjustments are made. As the adjustments are made, the tendency to fall to the right or left is reduced. When the multiplier holds a steady position, then the device has been balanced. The linkage depicted in FIG. 5 is completed by placing the tab in the eyelet 43. At that juncture, a first reading can then be taken. The first reading will represent the reading at an initial time. This reading is taken and typically recorded on a strip chart. Periodic or timed recordings are also made over a time interval.

This will typically show that the gravity vector is time variant.

Through the use of two gravity meters constructed in the manner shown in FIG. 1, mapping can be achieved. It is not possible to make a large number of observations over a given geographic area at the same instant. This introduces time variant error in readings. These errors are removed through the use of two sets of equipment. For a given locale where a mineral deposit is to be mapped, referring to a typical gravity measurement procedure, the first step is to select a base station location and to install one gravity meter at that location. This gravity meter is not moved; rather, it is installed, and measurements are taken over a period of time sufficient to enable the gravity map to be completed. This may require the recordal of data over a substantial period of time.

The second gravity meter is carried to a multitude of locations in the locale. Readings at each location are taken at a particular point in time. The relative or raw reading from each field location is temporarily tabulated. The reading of the base station at each particular point in time is also noted. The drift or deviation occurring as a result of time in the base station measurement is noted. This represents an error or offset factor. In other words, the drift of the base station from the beginning time (a common time for both instruments) is noted in the base station measurement, and the offset is added to or subtracted from the raw data obtained from field measurements. All field measurements are adjusted in this manner. If, for instance, fifteen field measurements are taken at one-hour intervals, then the fifteen measurements are recorded along with the time at which they are taken, and the adjustments to the raw data are thereafter made. This then brings all the measurements for a selected locale to a common time of occurrence. Variations which remain after this adjustment are indicative of anomolies in the local geology. These anomolies are useful in determining the nature of the geology.

While the foregoing is directed to the preferred embodiment, the scope of the present invention is determined by the claims which follow.

I claim:

1. An apparatus for measuring time variant gravity comprising:
    (a) a fixed pivot;
    (b) an elongate lever arm supported by said pivot for motion thereabout, said lever arm having a specified extent laterally of the pivot when supported in a generally horizontal position relative to said pivot;
    (c) a tank; and
    (d) a buoyant chamber connected to said lever arm and positioned within said tank and adapted to float in a liquid therein to move said lever arm as said chamber floats, wherein said lever arm is deflected by said chamber as it floats in said tank, and wherein an imbalance exists between said chamber and the liquid in said tank to raise or lower said chamber with time variant gravity.

2. The apparatus of claim 1 wherein said chamber is formed of a closed vessel having a vent to atmosphere and is adapted to receive and hold a liquid placed therein.

3. The apparatus of claim 1 wherein said tank is adapted to receive a first liquid therein and a second liquid floating on the surface of the first liquid wherein the second liquid is nonvaporative.

4. The apparatus of claim 1 wherein said tank incorporates an overhanging hood having an opening therein to receive a vertically deployed stem supporting said chamber having the form of a tank.

5. The apparatus of claim 1 wherein said horizontal lever arm incorporates a downwardly directed knife edge supported against a surface, said knife edge defining an axis of rotation therefor.

6. The apparatus of claim 5 including a point located in line with said knife edge on extension thereof to define an axis of rotation for said lever arm wherein said knife edge and said point rest on separate supports therefor.

7. The apparatus of claim 6 wherein said knife edge and point inscribe specified angles and the surfaces on which they are supported inscribe larger angles to permit rotational movement through a specified range by said knife edge and point moving in unison.

8. The apparatus of claim 7 wherein said point and knife edge are spaced from one another and wherein they are received on a pair of separated support surfaces having upwardly facing, angularly indented, conforming faces permitting rotational movement.

9. The apparatus of claim 8 including a pair of parallel frame members in said lever arm, each extending to said pivot and each terminating above said support surfaces.

10. For use with a gravity measuring instrument which forms an output in the form of a coupled mechanical movement, multiplier apparatus therefor which comprises:
    (a) a generally horizontal shaft;
    (b) first and second weight means deployed on the right and left of said shaft;
    (c) pivot support means supporting said shaft for rotation about said pivot support means wherein said pivot support means include:
        (1) a knife edge support;
        (2) support means for said knife edge which permit said knife edge to rest thereon and to rotate at least through a specified angle;
    (d) pointer means supported by said shaft and directed at a specified neutral location on balancing said shaft by movement of said weight means; and
    (e) input means including means for connecting movement from the gravity meter wherein said input means rotates said shaft.

11. The apparatus of claim 10 wherein said pointer means is constructed and arranged to have a length having a specified ratio to said input means, both being measured relative to said knife edge.

12. The apparatus of claim 10 including a protruding eyelet on said shaft having an opening therein which is adapted to receive means connected to a gravity meter for imparting movement thereof.

13. The apparatus of claim 12 including a closed housing about said multiplier apparatus for maintaining a stabilized temperature therein.

14. The apparatus of claim 13 including an opaque housing about said multiplier apparatus.

15. The apparatus of claim 13 including strip chart recorder means following said pointer means for converting movement thereof into an output signal for recordal thereby.

* * * * *